Figure 1:
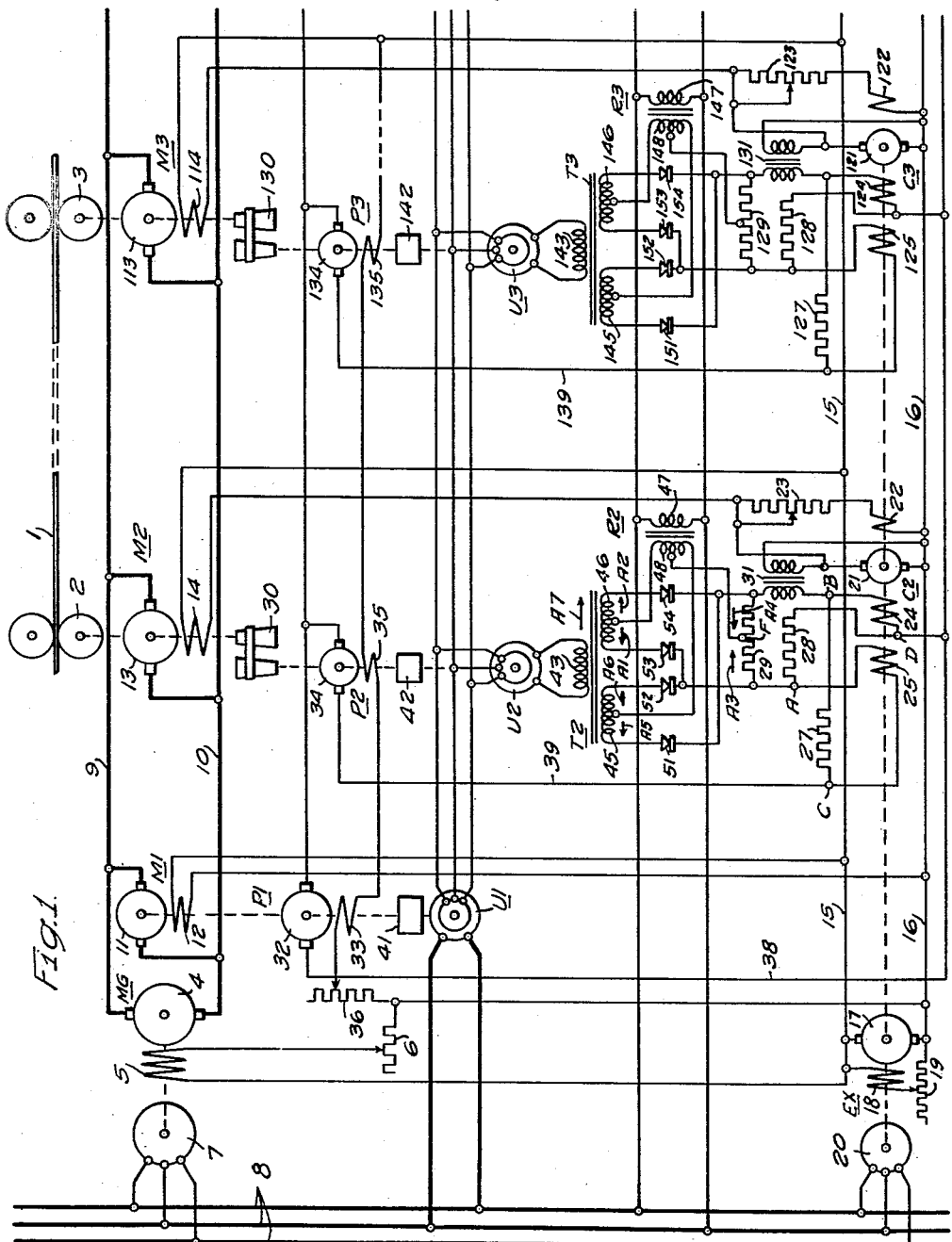

Oct. 19, 1948.   W. R. HARRIS   2,451,946
MOTOR CONTROL SYSTEM
Filed July 20, 1946

WITNESSES:  
E. A. McCloskey.  
C. M. Avery

INVENTOR  
Walter R. Harris.  
BY Paul E. Friedemann  
ATTORNEY

Patented Oct. 19, 1948

2,451,946

UNITED STATES PATENT OFFICE 2,451,946

MOTOR CONTROL SYSTEM

Walter R. Harris, Wilkinsburg, Pa., assignor to Westinghouse Electric Corporation, East Pittsburgh, Pa., a corporation of Pennsylvania Application July 20, 1946, Serial No. 685,059

12 Claims. (Cl. 318—85)

My invention relates to control systems for operating two or more electric motors, or machinery driven thereby, in a predetermined speed relation to one another. Such control systems used for paper machines, wire drawing machines, textile machines and other fabricating equipment in which several machine sections, working for instance sequentially on a travelling webb, thread, strip or strand material, must operate at the same speed or maintain another fixed speed ratio irrespective of changes in load or machine speed.

It has been proposed to achieve a control of this kind by having the speed of one motor (primary or master motor) selectively adjustable over the available range of speeds and controlling the armature voltage or field excitation of another motor (secondary or dependent motor) in dependence upon the differential value of two pilot voltages which are provided by two tachometer generators or equivalent voltage sources that measure the speed of the primary and secondary motors, respectively. It has also been proposed to regulate the speed of the secondary motor by means of an auxiliary regulating generator whose control field is differentially excited by the just-mentioned tachometer generators so that the regulating generator receives a corrective control signal when the pilot voltages become unbalanced due to a departure of the secondary motor speed from a predetermined ratio relative to the primary motor speed. A control system of this type is disclosed in the copending application Serial No. 597,192, filed June 2, 1945, of W. R. Harris and J. Z. Linsenmeyer, for speed regulating system, now Patent No. 2,414,524, and assigned to the assignee of the present patent. Such systems permit matching the speed of two or more motors with a remaining error in the order of ±1%.

It is an object of my invention to provide a speed-matching control system for electric motors which, while performing its control function substantially on the principle of the above-mentioned known system, can readily be made to operate with a still higher accuracy and hence is suitable for more exacting control requirements.

To this end, and in accordance with a feature of the invention, I provide a control generator, serving to furnish a variable voltage to a (secondary) motor to make it operate in a constant speed relation to another (primary) motor, with a speed-responsive field control in conjunction and joint operation with a position-responsive field control. I design these two controls preferably in such a manner that the speed-responsive control is predominant while the position-responsive control supplies only a corrective effect needed to obtain the desired high degree of accuracy.

According to more specific features of the invention, I provide the motors to be controlled with respective pilot generators for providing the speed-responsive pilot voltages and equip the same motors with respective synchro-tie units in order to provide the position-responsive control voltages. While in such a system the regulating generator may be provided with separate field windings to be energized by the pilot voltages and the position-responsive voltages, respectively, so that the effect of these different voltages are magnetically super-imposed on each other within the regulating generator, it is another feature of my invention to effect this superposition within a balanced bridge circuit which is so connected with the field system of the regulating generator that one and the same field performs the speed-responsive control as well as the position-responsive control.

These and other features of my invention will be understood from the following description of the embodiment illustrated in the drawing. The drawing shows in Figure 1 the circuit diagram of a motor control system according to the invention as applied to a paper or the like web fabricating machinery, while Fig. 2 represents the straight-line diagram of a bridge circuit appertaining to the control system of Fig. 1.

Figure 2:
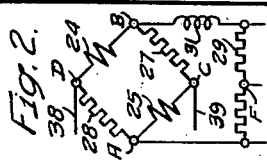

In Fig. 1, the paper, web or other material to be fabricated is denoted by 1. The machinery to be driven is represented by two sections or units denoted by 2 and 3, respectively, both shown schematically as roll presses. It is required to operate these two machine sections at the same speed or in a fixed speed relation to each other, and it is essential that this relation be accurately maintained without obviating the possibility of varying the operating speed within given limits.

The section 2 is driven by a direct-current motor M2, and a similar motor M3 is provided for driving the section 3.

The control system includes further a primary or master motor M1 which, if desired, may serve to drive another section of the same machinery. It is, however, also possible, as illustrated, to use the master motor M1 merely as a means for adjusting or dictating the speed of the section motors. This has the advantage that any of the machine sections can be kept at rest without affecting the operation of the other sections.

The motors M1, M2 and M3, as well as the motors (not illustrated) of additional machinery sections that may be present, are energized from a main generator MG, whose armature and field winding are denoted by 4 and 5, respectively. The field winding 5 is separately excited through a rheostat 6 which permits adjusting the field excitation in accordance with a desired speed and within the available speed range of the machinery. The armature 4 of generator MG is driven by a constant speed motor 7 energized from an alternating-current line 8. The output terminals of generator MG are connected to mains 9 and 10.

The armature 11 of the primary or master motor is connected across these terminals, and hence, is energized by the voltage adjusted by means of the rheostat 6. The field winding 12 of motor M1 receives separate excitation of constant magnitude. The armatures and field windings of motors M2 and M3 are denoted by 13, 14 and 113, 114, respectively. The armature 13 is also connected across mains 9 and 10, while the field winding 14 of motor M2 receives separate excitation of variable magnitude. The control systems for the two secondary motors M2 and M3 and of any additional secondary motors that may be present are substantially identical. For this reason, the reference numerals applied to the control system of motor M3 are identical with those of the control system for motor M2, except that the prefix 1 is added to the numerals appertaining to the system of motor M3. Thus, for instance, the armature 113 and field winding 114 of motor M3 are connected in substantially the same manner as the armature 13 and field winding 14 of motor M2. Therefore, the following description of the control system for motor M2 can readily be applied to the similar system of motor M3.

The constant excitation for the field windings 5 and 12 is taken from two direct-current mains 15 and 16. These mains are energized from a suitable direct-current source of substantially constant voltage which, in the illustrated embodiment, consists of an exciter EX whose armature and field winding are denoted by 17 and 18. Field winding 20 is shunt connected to the armature 17 in series with an adjusting rheostat 19 whose setting is normally not changed during the operation of the system. The exciter is driven at constant speed, for instance, by a motor 20 fed from the alternating-current line 8, although the exciter may instead be driven from the drive motor 7 of the main generator MG.

The excitation for the field windings of the secondary motors is derived from two voltage sources. One of these sources is represented by the mains 15 and 16, and hence, has a constant voltage. The other voltage source consists of a regulating generator C2 or C3. These generators have their respective armatures, such as the armature 21 of generator C2, driven at constant speed, for instance, from one of the above-mentioned constant speed motors. Control generator C2 has a self-excited field winding 22 connected across the armature 21 through a rheostat 23. This rheostat is preferably so adjusted that the resistance line of the self-excited circuit coincides substantially with the no-load magnetization characteristic of this machine. As a result, the self-excitation of the control generator is sufficient to maintain the output voltage of this machine at any value along the straight portion of the magnetization characteristic so that the separately excited field windings 24 and 25 (pilot field windings) need only supply the slight amount of additive or subtractive field excitation required for shifting the voltage point in either direction along the characteristic. In this manner, the control generator acts as a sensitive amplifier which produces an output voltage of relatively high magnitude in proportion to the relatively low signal intensity of the pilot field excitation.

The resultant voltage imposed on the field winding 14 of motor M2 is thus determined by the constant voltage between mains 15 and 16 and the variable voltage across the armature 21 of the control generator C2. The latter voltage is controlled by the pilot field windings 24 and 25 so as to boost or buck the constant exciter voltage, thus causing the resultant field voltage of winding 14 to increase or decrease if a correction of the motor speed is necessary to properly match the speed of motor M1.

In order to effect the just-mentioned control, the two pilot field windings 24 and 25 are connected with resistors 27, 28 and 29 so as to form the balanced bridge circuit separately illustrated in Fig. 2. This connection includes the secondary of a damping transformer 31 which performs an auxiliary function referred to in a later place. The resistance values of the pilot field windings 24 and 25 are equal and the resistance values of resistors 27 and 28 have the same value in order to obtain the required balance condition of the bridge circuit.

The bridge circuit is energized by two separate sources of pilot voltages across two pairs of diagonal points A, B and C, D, respectively, in the manner described presently.

A tachometer, or pilot generator P1, has its armature 32 driven from the primary motor M1. The appertaining field winding 33 is separately excited. Another pilot generator P2 has its armature 34 driven from motor M2 through a cone-pully arrangement 30 which permits adjusting the speed ratio to be maintained by motor M2 relative to the primary motor M1. The field winding 35 of pilot generator P2 receives separate excitation. A third pilot generator P3 is associated with motor M3 in a similar manner. The field windings of all pilot generators are preferably connected in series with each other and also in series with a calibrating rheostat 36 between the mains 15 and 16. The adjustment of rheostat 36 is not changed during the operation of the system so that each pilot generator generates constant voltage in proportion to the speed of the appertaining motor. The armature 32 of pilot generator P1 is connected in series opposition with armature 34 of pilot generator P2. Two leads 38 and 39 connect this armature series arrangement across the diagonal points C and D of the above-mentioned bridge circuit. When the speeds of motors M1 and M2 are accurately matched, the two respective pilot voltages balance and cancel each other so that no resultant pilot voltage is impressed across the bridge points C and D. When the speed of motor M2 departs from the speed of the primary motor, a resultant differential voltage in accordance with the differential speed value is impressed across bridge diagonal points C and D. The direction and magnitude of this differential voltage correspond to the direction and magnitude of the speed departure to be corrected.

Driven from the primary motor M1 is further the armature of a master synchro-tie unit U1, preferably through a reduction gear as schematically indicated at 41. The reduction ratio of this gear may be 10 to 1 so that the synchro-tie unit runs at a much slower speed that the master motor. The primary circuit of unit U1 is energized from the alternating current line 8. Similarly attached to motor M2 is the armature of a secondary synchro-tie unit U2, preferably also through a reduction gear 42. The primary circuit of unit U2 is energized from the secondary circuit of unit U1, while the secondary circuit of unit U2 feeds an output voltage to the primary winding 43 of a transformer T2. This output voltage is zero when the phase position of motor M2 is accurately in a given relation to that of motor M1. Any departure in phase position manifests itself in the occurrence of a finite output voltage across transformer winding 43, the phrase relation and magnitude of this output voltage relative to the voltage of line 8 is indicative of the degree of positional error. The transformer T2 has two secondary windings 45 and 46 each is tapped at its midpoint. A matching transformer R2 has its primary 47 connected to the alternating-current line 8 in the same manner as the primary circuit of the synchro-tie unit U1. The secondary winding 48 of transformer R2 has its end points connected to the respective midtaps of windings 45 and 46. Winding 48 has a tap at its midpoint connected to the midpoint F of the above-mentioned resistor 29. This resistor lies across the diagonal points A and B of the bridge circuit. Series connected with the four end points of the transformer windings 45 and 46 are four rectifier or valve units 51, 52, 53 and 54, respectively. The rectifier units 52 and 53 are both connected to the diagonal point A of the bridge circuit. The rectifier units 51 and 54 are similarly connected to the bridge diagonal point B. The corresponding portion of the control system for motor M3 is similarly designed and includes the transformers T3 and R3 corresponding to the transformers T2 and R2 of the control system for motor M2.

The functioning of the transformer and rectifier network will best be understood by first assuming that the primary and secondary motors are correctly in phase so that the output voltage across winding 43 of transformer T2 is zero and no voltage is induced in the secondary windings 45 and 46 of transformer T2. Then, only the reference transformer R2 is energized and induces two opposing voltages of equal magnitudes in the two sections of its secondary winding 48. Let us assume that in a given instant the upper end of winding 48 has a positive potential so that the voltage induced in the upper section of winding 48 drives two currents in the directions A1 and A2 through the two respective sections of winding 46 of transformer T2. Then currents traverse the respective valves 53 and 54 and flow to point F through the two sections of resistor 29 in the opposing directions A3 and A4. Since the network is balanced, the two currents in resistor 29 are equal so that the respective voltage drops cancel each other. As a result, the voltage across bridge terminal points A and B is zero. At the instant under observation, the voltage induced in the lower section of reference transformer winding 48 is ineffective because of the valve action of rectifiers 51 and 52 so that no current flows through winding 45 at that instant. When the voltage of reference transformer R2 reverse its phase, so that the upper end of secondary winding assumes a negative potential, the rectifiers 53 and 54 will block the flow of current through the winding 46, while now the lower section of winding 48 is so polarized as to pass a current through the two sections of winding 45 in the opposing directions A5 and A6. Then currents traverse the resistor 29 in the same directions A3 and A4 as mentioned above. Hence, the reference voltage supplied by transformer R2 is full-wave rectified and normally so balanced that the voltage impressed across bridge diagonal points A and B is constantly zero.

When now the winding 43 of transformer T2 becomes excited by a synchro-tie output voltage due to the occurrence of a positional error between motors M1 and M2, corresponding secondary voltages are induced in windings 45 and 46, and these voltages have the frequency of the reference voltage of winding 48. At the moment when winding 46 is traversed by currents in the directions A1 and A2, the secondary current induced in winding 46 by the transformer primary 43 may have the direction A7. Then this induced current (A7) is cumulative to the reference current (A2) in one section and differential relative to the reference current (A1) in the other section of winding 46. Consequently the current and voltage distribution of the network becomes unbalanced so that the currents (A3 and A4) and voltage drops in the two sections of resistor 29 becomes unequal. Hence, a resultant finite voltage is now impressed across bridge diagonal points A and B in a direction depending upon the positional error measured by the synchro-tie units. During the reversed phase of the synchro-tie output voltage, the same conditions persist, except that now the winding 45 is effective to produce the current and voltage superposition.

It thus will be seen from the foregoing that the bridge circuit is energized by two voltages, one being impressed across the diagonal points C and D in response to the speed differential measured by the pilot generators P1 and P2, and the other voltage being impressed across diagonal points A and B in response to the positional error measured by the synchro-tie units. Both voltages, when occurring, will force respective currents to flow through the pilot field windings 24 and 25 thus causing in both a cumulative excitation which, in turn, causes the regulating generator C2 to change its output voltage in the direction required to reduce the speed or positional error. Both voltages, though superimposed on each other within the four branches of the bridge circuit, are independent in their respective functions due to the balance characteristic of the bridge circuit. That is, any voltage occurring across diagonal points A and B will not produce a voltage drop between the other diagonal points C and D and vice versa. Consequently, the superposition of both control effects relative to the control generator C2 does not cause a mutual disturbance between the speed measuring and position-comparing voltages.

The control system as a whole is essentially a speed-regulating system whose main control performance is based on the function of the pilot generators. The pilot generator control is preferably made as accurate as possible so that the superimposed position-regulating component serves merely to correct any inadequacies of the speed-regulating devices. The position-regulating function of the system may amount, for instance, to approximately 10% of the control performance. The total result of the system is to maintain accurate speed matching control for paper and other web fabricating machinery to satisfy most exacting requirements.

The use of speed-reduction gears between the drive motors and the respective synchro-tie unit is not obligatory for systems according to the invention, but it offers the additional advantage of providing longer synchronizing periods and thus reduces the stiffness of the position-regulating parts. The damping transformer R2 has the effect of improving the stability of the regulating performance but is required only if a further improvement in the just-mentioned respect is desired. Since the primary of transformer 31 is traversed by direct current, no secondary voltage is produced during steady state conditions. Any change in primary voltage, however, causes a transient secondary voltage to be impressed across points A and B of the above-mentioned bridge circuit with the result to reduce or prevent hunting especially at rapid changes of large magnitude.

The use of a bridge circuit containing two cumulative pilot field windings, as compared with the possible use of two field windings separately energized by the resultant speed-responsive voltage and the resultant position-responsive voltage respectively, has the advantage that it permits avoiding the mutual magnetic linkage occurring between such differently excited field windings, and hence, affords an increase in the speed of response of the regulating generator.

Any error due to changes in the respective pilot voltages caused by unequal field heating of the pilot generators, is automatically balanced by virtue of the above-described series connection of the pilot generator fields. This contributes also to the extreme accuracy obtainable with such a system although it should be understood that a parallel connection of the pilot generator fields is likewise applicable.

Other modifications and changes, especially as regards the circuit connections between the individual elements of the control system, will be obvious to those skilled in the art, such modifications do not affect the principle of the invention and are intended to be within the essential features set forth in the claims annexed hereto.

I claim as my invention:

1. A motor control system comprising an adjustable-speed primary motor, a direct-current secondary motor, variable voltage means connected to said secondary motor for causing it to operate in a constant speed relation to said primary motor and including a voltage-controlling regulating generator having field winding means, two tachometer generators mechanically connected to said respective motors for providing two pilot voltages indicative of the respective motor speeds and electrically connected to said field winding means so as to balance the effects of said pilot voltages when said speeds have a given relation to each other, a primary synchro-tie unit mechanically connected to said primary motor to be driven thereby, a secondary synchro-tie unit mechanically connected to said secondary motor to be driven thereby and electrically connected to said primary synchro-tie unit to provide an output voltage dependent in phase and magnitude on the direction and extent of a positional difference occurring between said motors, and circuit means connecting said secondary synchro-tie unit with said field winding means for impressing on the latter a reversible corrective voltage under control by said output voltage in order to superimpose on said control generator a position-responsive corrective control for increased constancy of said speed relation.

2. A motor control system comprising an adjustable-speed primary motor, a direct-current secondary motor, variable voltage means connected to said secondary motor for causing it to operate in a constant speed relation to said primary motor and including a voltage-controlling regulating generator having field winding means, two speed-responsive voltage sources connected with said respective motors for providing two pilot voltages indicative of the respective motor speeds and electrically connected to said field winding means so as to balance the effects of said pilot voltages when said speeds have a given relation to each other, a primary synchro-tie unit mechanically connected to said primary motor to be driven thereby, a secondary synchro-tie unit mechanically connected to said secondary motor to be driven thereby and electrically connected to said primary synchro-tie unit to provide an output voltage dependent in phase and magnitude on the direction and extent of a positional difference occurring between said motors, and circuit means connecting said secondary synchro-tie unit with said field winding means for impressing on the latter a reversible corrective voltage under control by said output voltage in order to superimpose on said control generator a position-responsive corrective control for increased constancy of said speed relation.

3. A motor control system comprising an adjustable-speed primary motor, a direct-current secondary motor, variable voltage means connected to said secondary motor for causing it to operate in a constant speed relation to said primary motor and including a voltage-controlling regulating generator having field winding means, two speed-responsive voltage sources connected with said respective motors for providing two pilot voltages indicative of the respective motor speeds and electrically connected to said field winding means so as to balance the effects of said pilot voltages when said speeds have a given relation to each other, a primary synchro-tie unit mechanically connected to said primary motor to be driven thereby, a secondary synchro-tie unit mechanically connected to said secondary motor to be driven thereby and electrically connected to said primary synchro-tie unit to provide an alternating output voltage dependent upon the occurrence of a positional difference between said motors, a transformer for providing an alternating reference voltage, a rectifier circuit connecting said secondary synchro-tie unit and said transformer with said field winding means for imposing on the latter a rectified voltage whose direction and magnitude depend on the phase relation and magnitude of said output voltage relative to said reference voltage in order to superimpose on said control generator a position-responsive corrective control for increased constancy of said speed relation.

4. A motor control system comprising an adjustable-speed primary motor, a direct-current secondary motor, variable voltage means connected to said secondary motor for causing it to operate in a constant speed relation to said primary motor and including a voltage-controlling regulating generator having field winding means, two speed-responsive voltage sources connected with said respective motors for providing two pilot voltages indicative of the respective motor speeds and electrically connected to said field winding means so as to balance the effects of said pilot voltages when said speeds have a given relation to each other, a primary synchro-tie unit mechanically connected to said primary motor to be driven thereby, a secondary synchro-tie unit mechanically connected to said secondary motor to be driven thereby and electrically connected to said primary synchro-tie unit to provide an alternating output voltage dependent upon the occurrence of a positional difference between said motors, a first transformer connected to said secondary synchro-tie unit to be energized by said output voltage, a second transformer, alternating current supply means connected to said first synchro-tie unit and to said second transformer for primarily energizing them in a given phase relation to each other, circuit means secondarily interconnecting said two transformers for balancing their respective secondary voltages at a predetermined mutual positional relation of said unit, said circuit means including rectifying means and being connected to said field winding means for superimposing on the latter a reversible voltage whose direction and magnitude depend on direction and magnitude of said secondary voltages from said predetermined relation in order to superimpose on said control generator a position-responsive corrective control for increased constancy of said speed relation.

5. A motor control system comprising an adjustable-speed primary motor, a direct-current secondary motor, variable voltage means connected to said secondary motor for causing it to operate in a constant speed relation to said primary motor and including a voltage-controlling regulating generator having two cumulative field windings, a balanced bridge circuit having four branches and two diagonal pairs of terminals between said branches and containing said two field windings in two opposite ones of said branches, two speed-responsive voltage supply means associated with said respective motors and connected to one of said pairs of terminals so as to energize said bridge circuit by a voltage depending upon the departure of said secondary motor from a given speed relation to said primary motor, and position-responsive voltage means having a primary unit connected to said primary motor and a secondary unit connected to said secondary motor for providing an output voltage depending upon the departure of said secondary motor from a given positional relation to said primary motor, said latter voltage means being connected to said other pair of terminals to superimpose on said bridge circuit a position-responsive corrective energization.

6. A motor control system comprising an adjustable-speed primary motor, a direct-current secondary motor, variable voltage means connected to said secondary motor for causing it to operate in a constant speed relation to said primary motor and including a voltage-controlling regulating generator having two cumulative field windings, a balanced bridge circuit having four branches and two diagonal pairs of terminals between said branches and containing said two field windings in two opposite ones of said branches, two tachometer generators mechanically connected to said respective motors for providing two pilot voltages varying in accordance with the respective motor speeds, said tachometer generators being connected to one of said pairs of terminals in series-opposition relative to each other for field exciting said control generator in dependence upon the departure of said secondary motor from a given speed relation to said primary motor, two synchro-tie units mechanically connected to said respective motors and having an output circuit connected to said other pair of terminals to superimpose on said control generator a field excitation dependent upon the departure of said secondary motor from a given positional relation to said primary motor.

7. A motor control system comprising an adjustable-speed primary motor, a direct-current secondary motor, variable voltage means connected to said secondary motor for causing it to operate in a constant speed relation to said primary motor and including a voltage-controlling regulating generator having two cumulative field windings, a balanced bridge circuit having four branches and two diagonal pairs of terminals between said branches and containing said two field windings in two opposite ones of said branches, two speed-responsive voltage supply means associated with said respective motors and connected to one of said pairs of terminals so as to energize said bridge circuit by a voltage depending upon the departure of said secondary motor from a given speed relation to said primary motor, a primary synchro-tie unit mechanically connected to said primary motor to be driven thereby, a secondary synchro-tie unit mechanically connected to said secondary motor to be driven thereby and electrically connected to said primary synchro-tie unit to provide an alternating output voltage dependent upon the occurrence of a positional difference between said motors, a transformer for providing an alternating reference voltage, a resistor connected across said other pair of terminals and having a tapped midpoint, a rectifier circuit connecting said secondary unit and said transformer with said midpoint and said other pair of terminals so as to impress on said resistor a rectified voltage whose direction and magnitude depend upon the difference in phase and magnitude of said output and reference voltages for imposing on said bridge circuit a position-responsive corrective energization.

8. A motor control system comprising an adjustable-speed primary motor, a direct-current secondary motor, variable voltage means connected to said secondary motor for causing it to operate in a constant speed relation to said primary motor and including a voltage-controlling regulating generator having two cumulative field windings, a balanced bridge circuit having four branches and two diagonal pairs of terminals between said branches and containing said two field windings in two opposite ones of said branches, two speed-responsive voltage supply means associated with said respective motors and connected to one of said pairs of terminals so as to energize said bridge circuit by a voltage depending upon the departure of said secondary motor from a given speed relation to said primary motor, position-responsive synchro-tie means having a primary unit connected to said primary motor and a secondary unit connected to said secondary motor for causing said secondary unit to provide an alternating output voltage depending upon the departure of said secondary motor from a given positional relation to said primary motor, a first transformer connected to said secondary unit to be energized by said output voltage and having a winding with end points and a center tap, a reference transformer disposed for providing a reference voltage, a resistor connected across said other pair of terminals and having a center tap, said reference transformer having secondary terminals series connected between said two center taps, two rectifying units series-connected between said end points and the terminals of said other pair respectively for impressing on said resistor a rectified voltage whose direction and magnitude depend upon the difference in phase and magnitude of said output and reference voltages for imposing on said bridge circuit a position-responsive corrective energization.

9. A motor control system comprising an adjustable-speed primary motor, a direct-current secondary motor, variable voltage means connected to said secondary motor for causing it to operate in a constant speed relation to said primary motor and including a voltage-controlling regulating generator having two cumulative field windings, a balanced bridge circuit having four branches and two diagonal pairs of terminals between said branches and containing said two field windings in two opposite ones of said branches, two speed-responsive voltage supply means associated with said respective motors and connected to one of said pairs of terminals so as to energize said bridge circuit by a voltage depending upon the departure of said secondary motor from a given speed relation to said primary motor, position-responsive synchro-tie means having a primary unit connected to said primary motor and a secondary unit connected to said secondary motor for causing said secondary unit to provide an alternating output voltage depending upon the departure of said secondary motor from a given positional relation to said primary motor, a first transformer connected to said secondary unit to be energized by said output voltage and having two secondary windings each having two end points and a center tap, a reference transformer disposed for providing a reference voltage and being connected across said two center taps and having also a center tap, a resistor connected across said other pair of terminals and having a center tap connected with said center tap of said reference transformer, four rectifying units series connected to said end points respectively of said secondary windings and connected in pairs to the terminals of said other pair of terminals for impressing on said resistor and bridge circuit a full-wave rectified voltage whose direction and magnitude relative to said bridge circuit depend upon the difference in phase and magnitude between said output voltage and said reference voltage in order to superimpose on said control generator a position-responsive corrective field excitation.

10. A motor control system comprising an adjustable-speed primary motor, a direct-current secondary motor, variable voltage means connected to said secondary motor for causing it to operate in a constant speed relation to said primary motor and including a voltage-controlling regulating generator having field winding means, two tachometer generators disposed for providing two pilot voltages indicative of the respective motor speeds and having each an armature mechanically connected to one of said motors respectively to be driven thereby and a separately excited field coil, means for providing constant voltage, said field coils of said tachometer generators being connected to said voltage providing means in series relation to each other, said armature being electrically connected to said field winding means of said control generator in series-opposition relative to each other so as to balance the effects of said pilot voltages when said speeds are in a given proportion to each other, a primary synchro-tie unit mechanically connected to said primary motor to be driven thereby, a secondary synchro-tie unit mechanically connected to said secondary motor to be driven thereby and electrically connected to said primary synchro-tie unit to provide an output voltage dependent in phase and magnitude on the direction and extent of a positional difference occurring between said motors, and current means connecting said secondary synchro-tie unit with said field winding means for impressing on the latter a reversible corrective voltage under control by said output voltage in order to superimpose on said control generator a position-responsive corrective control for increased constancy of said speed relation.

11. A motor control system comprising an adjustable-speed primary motor, a direct current secondary motor having an armature and a speed-controlling field winding, a regulating generator connected to said motor field winding for providing it with variable excitation so as to cause said secondary motor to operate in a constant speed relation to said primary motor and having control field means for controlling said excitation, two speed-responsive voltage sources connected with said respective motors for providing two pilot voltages indicative of the respective motor speeds and electrically connected to said field winding means so as to balance the effects of said pilot voltage when said speeds have a given relation to each other, a primary synchro-tie unit mechanically connected to said primary motor to be driven thereby, a secondary synchro-tie unit mechanically connected to said secondary motor to be driven thereby and electrically connected to said primary synchro-tie unit to provide an output voltage dependent in phase and magnitude on the direction and extent of a positional difference occurring between said motors, and current means connecting said secondary synchro-tie unit with said field winding means for impressing on the latter a reversible corrective voltage under control by said output voltage in order to superimpose on said control generator a position-responsive corrective control for increased constancy of said speed relation.

12. A motor control system comprising an adjustable-speed primary motor, a direct current secondary motor having an armature and a speed-controlling field winding, circuit means for providing substantially constant voltage, a regulating generator having an armature series-connected with said motor field winding across said circuit means so that said winding receives excitation having a constant component modified by a variable component under control by said regulating generator so as to cause said secondary motor to operate in a constant speed relation to said primary motor, said regulating generator having field winding means for controlling said variable component, a primary synchro-tie unit mechanically connected to said primary motor to be driven thereby, a secondary synchro-tie unit mechanically connected to said secondary motor to be driven thereby and electrically connected to said primary synchro-tie unit to provide an output voltage dependent in phase and magnitude on the direction and extent of a positional difference occurring between said motors, and current means connecting said secondary synchro-tie unit with said field winding means for impressing on the latter a reversible corrective voltage under control by said output voltage in order to superimpose on said control generator a position-responsive corrective control for increased constancy of said speed relation.

WALTER R. HARRIS.

No references cited.